United States Patent
Deng et al.

(10) Patent No.: US 10,663,845 B2
(45) Date of Patent: May 26, 2020

(54) COLOR WHEEL DEVICE AND PROJECTOR

(71) Applicant: APPOTRONICS CORPORATION LIMITED, Shenzhen, Guangdong (CN)

(72) Inventors: Gaofei Deng, Shenzhen (CN); Wei Lin, Shenzhen (CN); Tao Xie, Shenzhen (CN); Yi Li, Shenzhen (CN)

(73) Assignee: Appotronics Corporation Limited, Shenzhen, Guangdong (CN)

( * ) Notice: Subject to any disclaimer, the term of this patent is extended or adjusted under 35 U.S.C. 154(b) by 0 days.

(21) Appl. No.: 16/320,960

(22) PCT Filed: Apr. 28, 2017

(86) PCT No.: PCT/CN2017/082451
§ 371 (c)(1),
(2) Date: Jan. 25, 2019

(87) PCT Pub. No.: WO2018/018974
PCT Pub. Date: Feb. 1, 2018

(65) Prior Publication Data
US 2019/0163041 A1     May 30, 2019

(30) Foreign Application Priority Data

Jul. 27, 2016   (CN) .......................... 2016 1 0602577

(51) Int. Cl.
*G03B 21/16*  (2006.01)
*H04N 9/31*   (2006.01)
(Continued)

(52) U.S. Cl.
CPC ........... *G03B 21/16* (2013.01); *G03B 21/145* (2013.01); *G03B 21/20* (2013.01); *H04N 9/3144* (2013.01)

(58) Field of Classification Search
CPC .... G03B 21/204; G03B 21/16; G03B 21/145; G03B 21/20; H04N 9/3144; H04N 9/3114
(Continued)

(56) References Cited

U.S. PATENT DOCUMENTS

| 8,678,597 B2 * | 3/2014 | Nishimura ............. G03B 21/16 |
| | | 353/119 |
| 2012/0013854 A1 | 1/2012 | Nishimura et al. |

(Continued)

FOREIGN PATENT DOCUMENTS

| CN | 201233499 Y | 5/2009 |
| CN | 102445102 A | 5/2012 |

(Continued)

OTHER PUBLICATIONS

International Search Report of corresponding Patent Application No. PCT/CN2017/082451—2 pages (dated Jun. 29, 2017).

(Continued)

*Primary Examiner* — Ryan D Howard
(74) *Attorney, Agent, or Firm* — Knobbe, Martens, Olson & Bear, LLP

(57) ABSTRACT

Disclosed are a color wheel device and a projector, wherein the color wheel device comprises: a color wheel chamber used for accommodating a color wheel module and provided with an air inlet and an air outlet; a heat exchanger having a heat-exchange core, the heat-exchange core being provided with a first channel for air in the color wheel chamber passing, the air outlet of the color wheel chamber being communicated with a heat-exchange inlet of the first channel, and a heat-exchange outlet of the first channel being communicated with the air inlet of the color wheel chamber to form a closed circulating air duct, wherein the first channel has multiple layers spaced apart from one another, and the space between two adjacent layers of the first channel forms a second channel for outside air passing; and an air propulsion device used for accelerating air flow.

20 Claims, 3 Drawing Sheets

(51) Int. Cl.
  *G03B 21/20* (2006.01)
  *G03B 21/14* (2006.01)
(58) Field of Classification Search
  USPC .......................................................... 353/84
  See application file for complete search history.

(56) References Cited

U.S. PATENT DOCUMENTS

2015/0029472 A1    1/2015   Lin et al.
2015/0338725 A1    11/2015  Kase

FOREIGN PATENT DOCUMENTS

| CN | 203365896 U   | 12/2013 |
| CN | 103807810 A   | 5/2014  |
| CN | 104661005 A   | 5/2015  |
| CN | 206057780 U   | 3/2017  |
| JP | 2008-175513 A | 7/2008  |
| JP | 2016-066061 A | 4/2016  |

OTHER PUBLICATIONS

Office Action in corresponding Japanese Patent Application No. 2019-504039 dated Dec. 13, 2019, 6 pages.
Extended European Search Report in corresponding European Patent Application No. 17833280.5 dated Mar. 9, 2020.

* cited by examiner

COLOR WHEEL DEVICE AND PROJECTOR

CROSS-REFERENCE TO RELATED APPLICATIONS

The present application is a national phase application of International Application No. PCT/CN2017/082451 filed Apr. 28, 2017, which claims priority to Chinese Patent Application No. 201610602577.9, filed on Jul. 27, 2016, the contents of which are incorporated herein by reference in their entireties.

TECHNICAL FIELD

The present disclosure relates to the field of optoelectronics and, in particular to a color wheel device and a projector.

BACKGROUND

A color wheel is a key component of a projection display device that generates light required for imaging. In laser display technology, the color wheel carries a wavelength conversion material that converts a light beam from a solid state light source into an excited light of a desired wavelength. A large amount of heat will be generated during the process of converting the light beam from the solid state light source into the excited light by the color wheel, and the light conversion efficiency of the wavelength conversion material will be influenced if the heat cannot diffuse timely. In addition, the dust also has a great influence on heat-diffusion and conversion efficiency of the color wheel, and if the dust accumulates on the color wheel, the portion carrying dust will easily cause the rapid accumulation of heat, and moreover, in severe cases, the color wheel will be burnt.

SUMMARY

Technical Problem to be Solved

Therefore, the color wheel as a wavelength conversion component has extremely high requirements for heat-diffusion and dust prevention, while heat-diffusion and dust prevention are a pair of contradictory factors. In the prior art, the color wheel is sealed in a color wheel housing, and the housing is usually set as a fin that facilitates heat-diffusion, so that heat conducted to the housing from the color wheel is taken away by the contact between the outside air and the housing. However, good heat-diffusion effect cannot be achieved with this method, especially in applications where energy of the irradiation beam is getting higher and higher, such as the application in which the energy density of light is large, temperature of the color wheel will exceed an upper limit of the endured temperature, which will cause the optical performance of the color wheel to degrade or even burn the color wheel, and thus affect the service life of the color wheel.

Solution to the Problem

The present disclosure provides a color wheel device and a projector, aiming to solve the problems of degraded color wheel performance and reduced service life caused by poor heat-diffusion in the existing color wheel device.

According to a first aspect of the present disclosure, the present disclosure provides a color wheel device comprising:

a color wheel chamber, the color wheel chamber being used for accommodating a color wheel module, the color wheel chamber being provided with an air inlet and an air outlet; the color wheel module carrying a wavelength conversion layer configured to generate excited light under irradiation of excitation light;

a heat exchanger, the exchanger comprising a heat-exchange core, the heat-exchange core being provided with a first channel through which air in the color wheel chamber passes, the air outlet of the color wheel chamber being communicated with a heat-exchange inlet of the first channel, and a heat-exchange outlet of the first channel being communicated with the air inlet of the color wheel chamber to form a closed circulating air duct; the first channel having multiple layers spaced apart from one another, and a space between two adjacent layers of the first channel forming a second channel for outside air passing; the second channel having an air inlet and an air outlet provided on two opposite surfaces of the heat exchanger, respectively; and an air propulsion device configured to drive air in the circulating air duct to flow. The propulsion device is provided in a connecting channel that communicates the heat-exchange outlet of the first channel with the air inlet of the color wheel chamber.

In the color wheel device, the connecting channel has a height smaller than ⅓ of a height of the second channel.

In the color wheel device, the air outlet and the air inlet are arranged at diagonal positions in the color wheel chamber, and the heat-exchange inlet of the first channel and the heat-exchange outlet of the first channel are arranged at diagonal positions in the first channel; wherein the air outlet is located at a lower diagonal position of the color wheel chamber, and the heat-exchange inlet of the first channel is located at a lower diagonal position of the first channel.

In the color wheel device, a flowing direction of air in the first channel is perpendicular to a flowing direction of air in the second channel.

In the color wheel device, the heat exchanger is provided at least at one position in the circulating air duct.

In the color wheel device, an inner wall of the color wheel chamber is provided with a heat conduction column for heat exchange with an air flow in the color wheel chamber; and one surface of the wavelength conversion layer at a backlight side thereof is provided with a heat-diffusion tooth.

In the color wheel device, the color wheel module comprises a color wheel substrate used for carrying the wavelength conversion layer, and an outer edge of the color wheel substrate is provided with heat-diffusion teeth distributed along its circumference.

In the color wheel device, at the center of the circulating air duct, a heat-diffusion chamber is provided with two ends connected with outside, and the color wheel chamber, the first channel of the heat exchanger and the connecting channel are arranged around the heat-diffusion chamber.

Beneficial Effect

According to a second aspect of the present disclosure, a projector is provided and comprises:

a color wheel device and a heat-diffusion fan, where the heat-diffusion fan is used for providing power for air flow inside the projector, and the color wheel device is the color wheel device described above.

In the color wheel device and the projector provided by the present disclosure, by providing, in the circulating air duct, a plurality of layers of first channels formed by partition of aluminum foils or copper foils, a second channel used for the flow of the outside air is formed between two adjacent layers of first channels, such that an air flow in the circulating air duct intersects with the flow direction of the outside air, and heat exchange is directly preformed between the outside air and the air in the circulating air duct by the aluminum foils or copper foils, significantly improving the heat-diffusion efficiency of the color wheel device; the blower and the heat-diffusion fan respectively control the flow rates of the air flows inside and outside the circulating air duct, enabling the heat exchange to be performed faster; the heat exchange column provided in the circulation air conduct and the heat-diffusion teeth provided on the color wheel substrate respectively increase the heat exchange area between the color wheel substrate and the air in the circulation air conduct and between the sealed housing and the air in the circulation air conduct, which further enhances the heat-diffusion efficiency of the color wheel device.

DESCRIPTION OF EMBODIMENTS

The present disclosure will be further described in detail below with reference to specific embodiments and the accompanying drawings.

Embodiment 1

Figure 1:
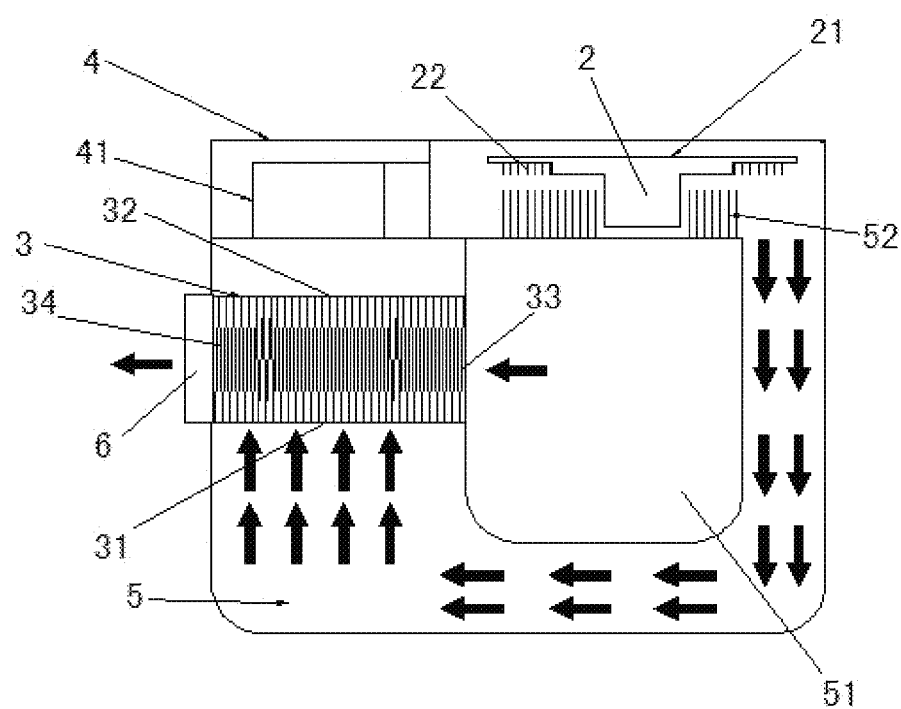
FIG. 1 is a schematic diagram showing a planar structure of a color wheel device according to an embodiment of the present disclosure.
Figure 2:
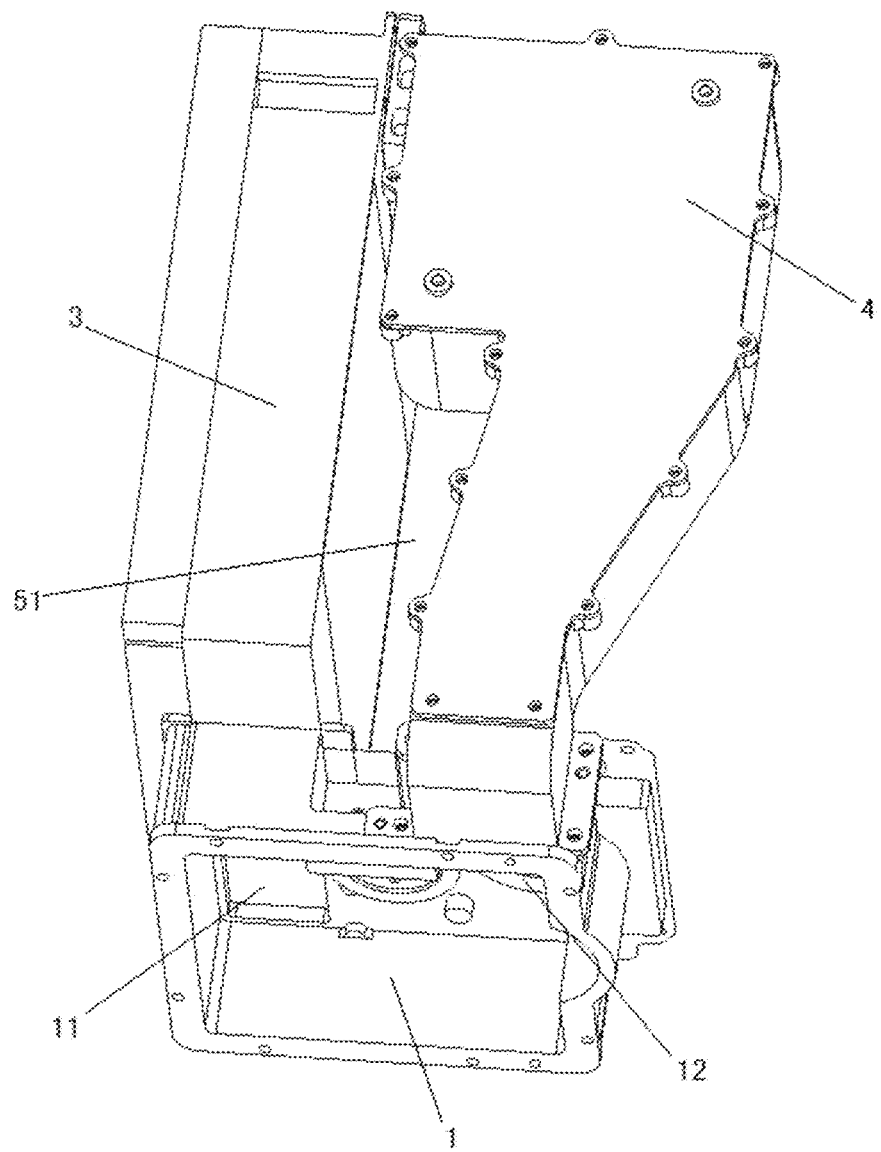
FIG. 2 is a schematic diagram showing a three-dimensional structure of the color wheel device according to an embodiment of the present disclosure.

The color wheel device provided in the present embodiment, as shown in FIG. 1 and FIG. 2, includes a color wheel chamber 1, a color wheel module 2, a heat exchanger 3, and a connecting channel 4. The color wheel module 2 is accommodated inside the color wheel chamber 1, and the connecting channel 4 connects the heat exchanger 3 and the color wheel chamber 1. An air propulsion device is provided in the connecting channel 4 for accelerating the air flow inside the color wheel chamber 1. The air propulsion device in the present embodiment is a blower 41.

The color wheel module 2 includes a color wheel substrate 21 carrying a wavelength conversion layer, and the wavelength conversion layer contains a wavelength conversion material that absorbs excitation light and is excited to generate specific excited light. The most commonly used wavelength conversion material is a fluorescent powder, such as yttrium aluminum garnet (YAG) fluorescent powder, which absorbs blue light and is excited to generate yellow excited light. The wavelength conversion material may also be a material having wavelength conversion capability such as quantum dot and fluorescent dye, and is not limited to the fluorescent powder. In many cases, the wavelength conversion material is generally powdery or granular, making it difficult to form a wavelength conversion material layer directly, and thus, at this time, it is necessary to use a binder to fix the respective wavelength conversion material particles together so as to form a specific shape such as a sheet shape.

The color wheel chamber 1 has an air inlet 11 and an air outlet 12 provided inside thereof at diagonal positions, and the air outlet 12 is located at a lower diagonal position of the color wheel chamber. One end port of the connecting channel 4 is communicated with the air inlet 11 of the color wheel chamber 1, and the other end port thereof is communicated with a heat-exchange core of the heat exchanger 3. The blower 41 provided in the connecting channel 4 is used for driving the flow inside the circulating duct.

Further, the heat exchanger 3 includes a heat-exchange core, and the heat-exchange core is provided with a plurality of layers of first channels. A heat-exchange inlet 31 and a heat-exchange outlet 32 of the first channel are provided in the first channel at diagonal positions, and the heat-exchange inlet 31 of the first channel is located at a lower diagonal position of the first channel. The air outlet 12 of the color wheel chamber 1 is communicated with the heat-exchange inlet 31 of the first channel, and the heat-exchange outlet 32 of the first channel is communicated with the air inlet 11 of the color wheel chamber 1 through the connecting channel 4. Therefore, a circulating air duct 5 is formed so that the air flow flows from the air outlet 12 of the color wheel chamber 1 to the heat-exchange inlet 31 of the first channel and then from the heat-exchange outlet 32 of the first channel back to the air inlet 11 of the color wheel chamber 1. In this way, the air flow in the circulating air duct 5 that has absorbed the heat of the color wheel module 2 is cooled by the heat exchanger 3 and then circulates through the color wheel module 2, thereby achieving the effect of cooling the color wheel module 2 (as indicated by the multiple rows of arrows in FIG. 1). The first channel is partitioned into multiple microchannels by metal, metal alloy, plastic or paper material, and the microchannels can be layered or tubular. Preferably, layered channels which are separated by aluminum foils or copper foils are adopted in the present embodiment. In other embodiments of the present disclosure, an aluminum sheet, a silver sheet or a cardboard may be used to form the first channels, and each layer of first channel includes an aluminum foil or a copper foil forming a channel wall. Two adjacent layers of first channels are spaced apart from each other, and ends of two adjacent channel walls are connected to each other, that is, two adjacent first channels are connected to each other at the heat-exchange inlet 31, and are also connected together at the heat-exchange outlet 32 correspondingly. In this way, openings linking to the outside only exist in two opposite directions in the space between the two adjacent layers of first channels. Thus, a second channel for the passage of outside air is formed between the two layers of first channels. The openings at two ends of the second channel serve as an air inlet 33 and an air outlet 34 of the second channel, and there is a common channel wall between the first channel and the second channel. The aluminum foil or copper foil that acts as the channel wall separates the first channel from the second channel, such that the first channel and the second channel are formed into a spatially intersecting structure. Since there is a temperature difference between the hot air flow in the first channel and the outside airflow in the second channel, the hot air in the first channel and the outside air in the second channel directly exchange heat through the aluminum foil/copper foil at the position where the two channels intersect without requiring any other intermediate medium, and moreover, the aluminum foil/copper foil is thin, so that the heat exchange efficiency of the heat exchanger 3 is excellent.

Preferably, a height of the connecting channel 4 is set to be smaller than ⅓ of a height of the second channel, and the height indicated here is a solid thickness of the connecting channel, i.e., a distance from one surface to the other opposite surface. The height of the second channel also refers to a distance between the multiple second channels. At most ⅓ of the air flow passing through the second channel is blocked by the connecting channel, so that most of the air flow is not obstructed by the connecting channel under the influence of the whole fan, ensuring the miniaturization of the components while effectively reducing circulation resistance for the air flow, which is advantageous for the improvement of the heat-diffusion efficiency.

As shown in FIG. 1 and FIG. 2, a heat-diffusion chamber 51 is formed at the center of the circulating air duct 5, and the circulating air duct 5 is disposed around the heat-diffusion chamber 51. The air inlet 33 of the second channel of the heat exchanger 3 is disposed on a side surface, which is facing the heat exchange chamber 51, of the heat exchanger 3. The second channel connects the heat-diffusion chamber 51 with the peripheral space of the circulating air duct 5. The air outlet 34 of the second channel is disposed on a side surface, which is facing away from the heat exchange chamber 51, of the heat exchanger 3. Specifically, the heat-diffusion chamber 51 is enclosed by the outer surface of the circulating air duct 5, so that the circulating air duct 5 as a whole is shaped like two homocentric squares or similar concentric circles. Both ends of the heat-diffusion chamber 51 communicate with the outside to ensure smooth flowing of outside air passing through the heat-diffusion chamber 51.

Preferably, a running direction of the second channel is preferably perpendicular to the first channel, such that the flowing direction of the air in the first channel is perpendicular to the flowing direction of the air in the second channel, thereby reducing the heat exchange time of the air flow at the position where the first channel and the second channel intersect, so as to maintain a large temperature difference in the portions of the two air flows participating in the heat exchange; and in addition, the heat exchange area is increased by the multiple layers of the first channel and the second channel that mutually intersect, and thus the heat exchange efficiency is enhanced.

In order to improve the heat exchange efficiency between the air in the circulating air duct 5 and the color wheel module 2, it is also possible to provide heat-diffusion teeth 22 at an outer edge and/or a backlight side of the color wheel substrate 21. Preferably, the heat-diffusion teeth 22 are provided on the outer edge of the color wheel substrate 21, and the surface of the heat-diffusion tooth 22 thus provided is parallel to the color wheel substrate 21. In this way, the air resistance caused by the air flow of the heat-diffusion tooth 22 in the circulating air duct 5 can be minimized, and moreover, heat-diffusion surface of the color wheel substrate 21 can be increased, thereby improving the heat exchange efficiency between the color wheel module 2 and the air in the color wheel chamber 1. In the present embodiment, several heat conduction columns 52 may be also provided at a position of the inner wall of the color wheel chamber 1 directly facing the color wheel module 2, and the heat conduction columns 52 increase the heat exchange area between the color wheel chamber 1 and the air flow passing through the surface thereof, thereby enhancing the heat-diffusion efficiency of the color wheel chamber 1. The heat conduction column can adopt a tapered structure in consideration of issues of heat-diffusion efficiency and air resistance, i.e., the diameter of a portion of the heat conduction column close to the color wheel is smaller than the diameter of a portion of the heat conduction column far away from the color wheel. As a further optimization of the present disclosure, the backlight surface of the color wheel substrate 21 may be provided with teeth, while the teeth and the color wheel substrate 21 may form a centrifugal driving device for driving the air in the color wheel chamber to flow, so as to replace the blower 41.

Embodiment 2

Figure 3:
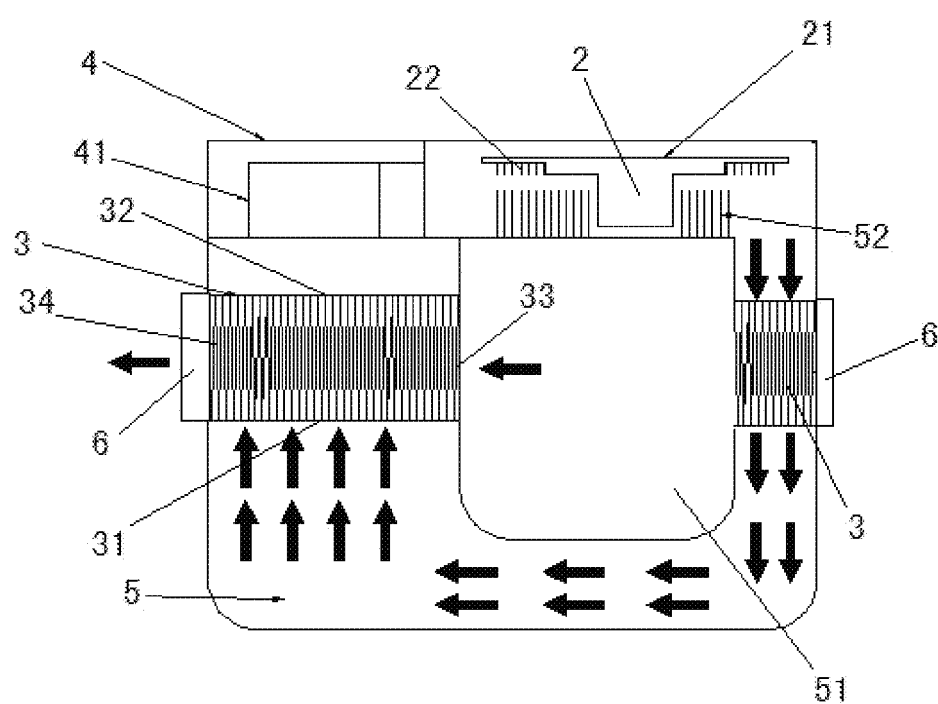
FIG. 3 is a schematic diagram showing a planar structure of a color wheel device according to another embodiment of the present disclosure.

Further, in other embodiments of the present disclosure, a plurality of heat exchangers 3 may be sequentially provided along the running direction of the circulation air conduct 5, which significantly increases the heat-diffusion effect of the color wheel device by multi-stage heat-diffusion. As shown in FIG. 3, two heat exchangers 3 are provided on the circulating air duct 5, and the air flow flowing out of the air outlet 12 of the color wheel chamber 1 sequentially passes through the two heat exchangers 3, and then flows back to the air inlet 11 of the color wheel chamber 1 after being cooled twice. By circulating in this manner, the temperature generated by the color wheel module 2 is continuously transmitted to the outside so as to achieve a cooling effect.

Embodiment 3

Based on the description of the above embodiments, the present disclosure further provides a projector including a color wheel device and a heat-diffusion fan, and the color wheel device is the color wheel device described in the above embodiments. The heat-diffusion fan 6 is a heat-diffusion fan of the projector, and the air flow passing through the second channel is withdrawn with an accelerated speed under the action of the heat-diffusion fan 6, so that the outside air in the heat-diffusion chamber 51 quickly passes through the second channel (as shown by the single row arrow in FIG. 1), thereby improving heat exchange efficiency. The flow rates of the two air flows participating in the heat exchange are increased by the blower 41 and the heat radiating fan 6 respectively, thereby increasing the heat exchange frequency.

In the color wheel device and the projector provided by the present disclosure, a plurality of layers of first channels formed by the partition of aluminum foils or copper foils is formed in the circulating air duct, and a second channel used for flow of the outside air is formed between two adjacent layers of first channels, such that an air flow in the circulating air duct and the flow of the outside air intersect, and heat exchange is directly preformed between the outside air and the air in the circulating air duct by the aluminum foils or copper foils, significantly improving the heat-diffusion efficiency of the color wheel device; the blower and the heat-diffusion fan respectively provide the flow rates of the air flows inside and outside the circulating air duct, enabling the heat exchange to be performed faster; the heat exchange column arranged in the circulation air conduct and the heat-diffusion teeth arranged on the color wheel substrate respectively increase the heat exchange area between the color wheel substrate and the air in the circulation air conduct and between the sealed housing and the air in the circulation air conduct, which further enhances the heat-diffusion efficiency of the color wheel device.

The above description is a further detailed description of the present disclosure in connection with the specific embodiments, and the specific embodiments of the present disclosure are not limited to the above description. For those skilled in the art to which the present disclosure pertains, several simple derivations or substitutions can be made without departing from the inventive concept.

What is claimed is:

1. A color wheel device, comprising:
    a color wheel chamber, the color wheel chamber being used for accommodating a color wheel module, the color wheel chamber being provided with an air inlet and an air outlet; the color wheel module carrying a wavelength conversion layer configured to generate excited light under irradiation of excitation light;
    a heat exchanger, the exchanger comprising a heat-exchange core, the heat-exchange core being provided with a first channel through which air in the color wheel chamber passes, the air outlet of the color wheel chamber being communicated with a heat-exchange inlet of the first channel, and a heat-exchange outlet of the first channel being communicated with the air inlet of the color wheel chamber to form a closed circulating air duct; the first channel having multiple layers spaced apart from one another, and a space between two adjacent layers of the first channel forming a second channel for outside air passing; the second channel having an air inlet and an air outlet provided on two opposite surfaces of the heat exchanger, respectively; and
    an air propulsion device configured to drive air in the circulating air duct to flow.

2. The color wheel device according to claim 1, wherein the air propulsion device is provided in a connecting channel that communicates the heat-exchange outlet of the first channel with the air inlet of the color wheel chamber.

3. The color wheel device according to claim 1, wherein the heat-exchange outlet of the first channel is in communication with the air inlet of the color wheel chamber through a connecting channel, and the connecting channel has a height smaller than ⅓ of a height of the second channel.

4. The color wheel device according to claim 3, wherein the air outlet and the air inlet are arranged at diagonal positions in the color wheel chamber, and the heat-exchange inlet of the first channel and the heat-exchange outlet of the first channel are arranged at diagonal positions in the first channel; wherein the air outlet is located at a lower diagonal position of the color wheel chamber, and the heat-exchange inlet of the first channel is located at a lower diagonal position of the first channel.

5. The color wheel device according to claim 1, wherein a flowing direction of air in the first channel is perpendicular to a flowing direction of air in the second channel.

6. The color wheel device according to claim 1, wherein the heat exchanger is provided at least at one position in the circulating air duct.

7. The color wheel device according to claim 1, wherein an inner wall of the color wheel chamber is provided with a heat conduction column for heat exchange with an air flow in the color wheel chamber; and one surface of the wavelength conversion layer at a backlight side thereof is provided with heat-diffusion teeth.

8. The color wheel device according to claim 1, wherein the color wheel module comprises a color wheel substrate used for carrying the wavelength conversion layer, and an outer edge of the color wheel substrate is provided with heat-diffusion teeth distributed along its circumference.

9. The color wheel device according to claim 1, wherein the heat-exchange outlet of the first channel is in communication with the air inlet of the color wheel chamber through a connecting channel, and wherein at the center of the circulating air duct, a heat-diffusion chamber is provided with two ends connected with outside, and the color wheel chamber, the first channel of the heat exchanger and the connecting channel are arranged around the heat-diffusion chamber.

10. A projector comprising a color wheel device and a heat-diffusion fan, the heat-diffusion fan providing power for air flowing inside the projector, the color wheel device being the color wheel device according to claim 1, wherein air flowing through the second channel is driven by the heat-diffusion fan.

11. The color wheel device according to claim 2, wherein an inner wall of the color wheel chamber is provided with a heat conduction column for heat exchange with an air flow in the color wheel chamber; and one surface of the wavelength conversion layer at a backlight side thereof is provided with heat-diffusion teeth.

12. The color wheel device according to claim 3, wherein an inner wall of the color wheel chamber is provided with a heat conduction column for heat exchange with an air flow in the color wheel chamber; and one surface of the wavelength conversion layer at a backlight side thereof is provided with heat-diffusion teeth.

13. The color wheel device according to claim 4, wherein an inner wall of the color wheel chamber is provided with a heat conduction column for heat exchange with an air flow in the color wheel chamber; and one surface of the wavelength conversion layer at a backlight side thereof is provided with heat-diffusion teeth.

14. The color wheel device according to claim 2, wherein the color wheel module comprises a color wheel substrate used for carrying the wavelength conversion layer, and an outer edge of the color wheel substrate is provided with heat-diffusion teeth distributed along its circumference.

15. The color wheel device according to claim 3, wherein the color wheel module comprises a color wheel substrate used for carrying the wavelength conversion layer, and an outer edge of the color wheel substrate is provided with heat-diffusion teeth distributed along its circumference.

16. The color wheel device according to claim 4, wherein the color wheel module comprises a color wheel substrate used for carrying the wavelength conversion layer, and an outer edge of the color wheel substrate is provided with heat-diffusion teeth distributed along its circumference.

17. The color wheel device according to claim 2, wherein at the center of the circulating air duct, a heat-diffusion chamber is provided with two ends connected with outside, and the color wheel chamber, the first channel of the heat exchanger and the connecting channel are arranged around the heat-diffusion chamber.

18. The color wheel device according to claim 3, wherein at the center of the circulating air duct, a heat-diffusion chamber is provided with two ends connected with outside, and the color wheel chamber, the first channel of the heat exchanger and the connecting channel are arranged around the heat-diffusion chamber.

19. A projector, comprising a color wheel device and a heat-diffusion fan, the heat-diffusion fan providing power for air flowing inside the projector, the color wheel device being the color wheel device according to claim 2, wherein air flowing through the second channel is driven by the heat-diffusion fan.

20. A projector, comprising a color wheel device and a heat-diffusion fan, the heat-diffusion fan providing power for air flowing inside the projector, the color wheel device being the color wheel device according to claim 3, wherein air flowing through the second channel is driven by the heat-diffusion fan.

* * * * *